United States Patent [19]

Wanasz

[11] Patent Number: 5,122,797
[45] Date of Patent: Jun. 16, 1992

[54] PORTABLE WARNING LIGHT SYSTEM

[76] Inventor: Michael J. Wanasz, 8107 S. Yukon Way, Littleton, Colo. 80123

[21] Appl. No.: 666,994

[22] Filed: Mar. 11, 1991

Related U.S. Application Data

[63] Continuation of Ser. No. 467,674, Jan. 19, 1990, abandoned.

[51] Int. Cl.⁵ ............................................. B60Q 7/00
[52] U.S. Cl. .............................. 340/908.1; 340/908; 340/953
[58] Field of Search ............... 340/908, 908.1, 953, 340/473, 487, 489; 116/63 P; 40/590, 550; 280/408, 410

[56] References Cited

U.S. PATENT DOCUMENTS

| | | | |
|---|---|---|---|
| 1,334,191 | 3/1920 | Thomas | 116/63 R |
| 1,987,863 | 1/1935 | Murphy | 40/130 |
| 2,782,745 | 2/1957 | Paschke | 116/63 |
| 2,907,998 | 10/1959 | Conly | 340/908.1 X |
| 3,487,553 | 1/1970 | Stingl | 33/204 |
| 3,883,846 | 5/1975 | Bruner | 340/908 X |
| 4,087,785 | 5/1978 | Dodich | 340/908.1 |
| 4,170,767 | 10/1979 | Tanner | |
| 4,253,085 | 2/1981 | Hidler et al. | |
| 4,523,771 | 6/1985 | Bender | 280/410 X |
| 4,543,905 | 10/1985 | McKenney | 340/908 X |
| 4,593,265 | 6/1986 | McKenney | 340/908.1 |
| 4,759,606 | 7/1988 | McDowell | 350/97 |
| 4,812,844 | 3/1989 | Kallstrom | 340/949 |
| 4,835,515 | 5/1989 | McDermott et al. | 340/472 |
| 4,857,920 | 8/1989 | Kataoka et al. | 340/907 |
| 4,898,399 | 2/1990 | Adams | 280/408 |

Primary Examiner—Jin F. Ng
Assistant Examiner—Brian R. Tumm
Attorney, Agent, or Firm—John E. Reilly

[57] ABSTRACT

A portable warning light system is made up of a main frame member which is pivotally mounted on a trailer, a pair of light bars are pivotally connected on the main frame for movement in a plane parallel to the frame between a retracted or travel position and an extended position, and the main frame can be selectively positioned at different angles between the vertical and horizontal.

10 Claims, 3 Drawing Sheets

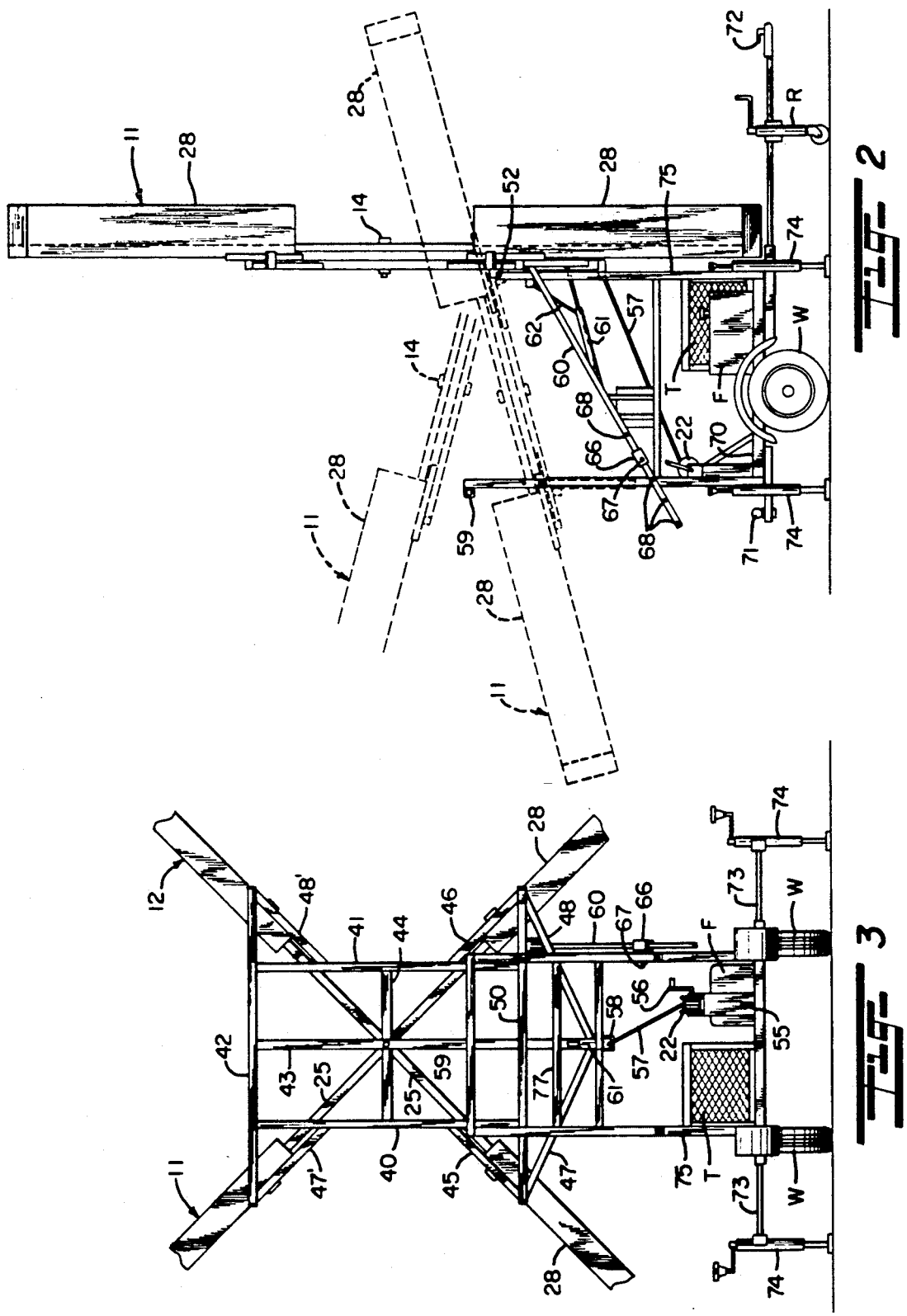

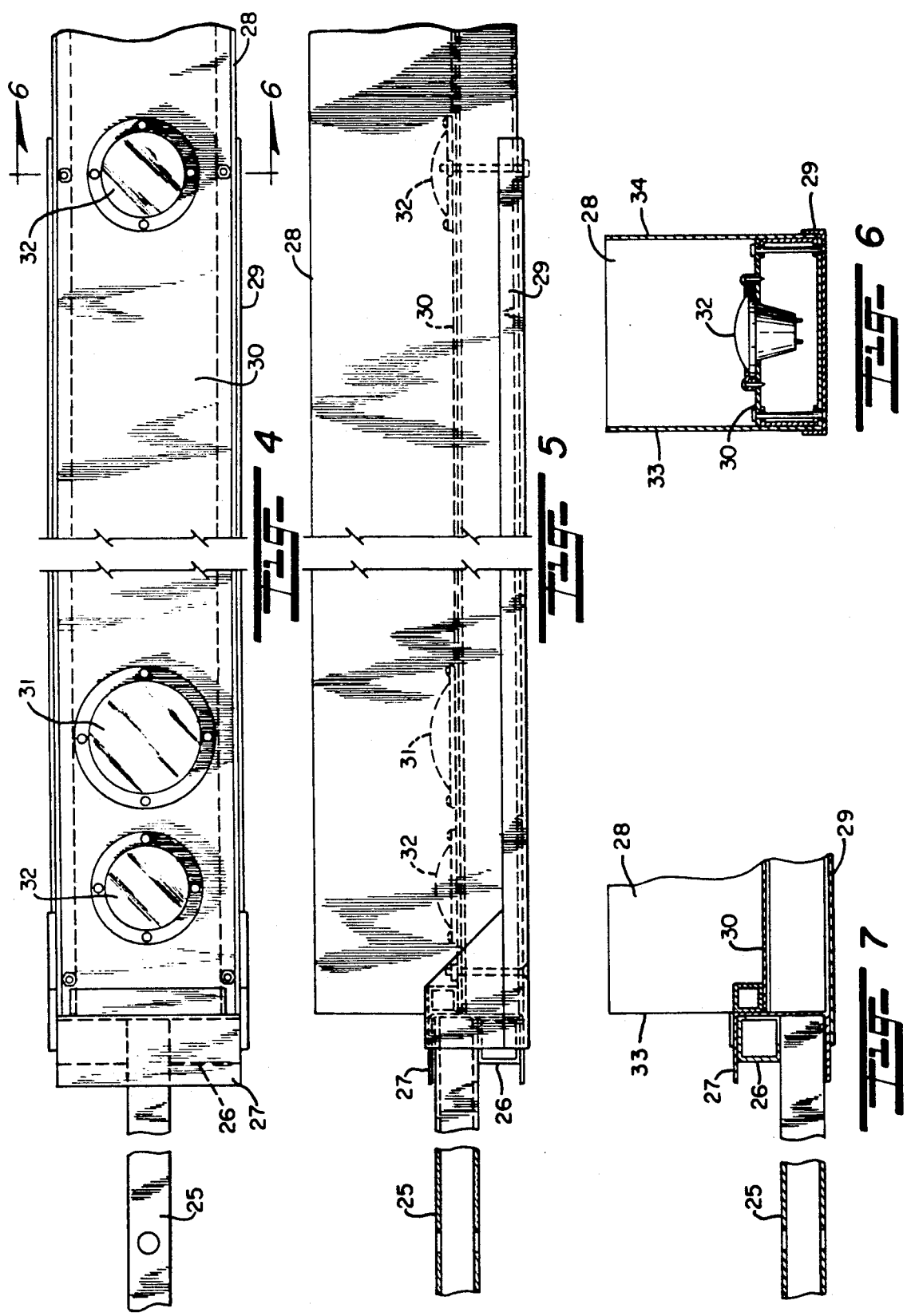

PORTABLE WARNING LIGHT SYSTEM

CROSS-REFERENCE TO RELATED APPLICATIONS

This application is a continuation application of Ser. No. 467,674, now abandoned, filed Jan. 19, 1990, for PORTABLE WARNING LIGHT SYSTEM, invented by Michael J. Wanasz.

This invention relates to warning light systems adapted for use in traffic control; and more particularly relates to a novel and improved portable runway marker apparatus to serve as a visual warning to pilots of a closed runway or taxiway.

BACKGROUND AND FIELD OF THE INVENTION

Warning or signal light systems are in widespread use for various applications and particularly as traffic control devices to warn of hazardous road conditions. Similarly, visual warning system for aircraft traffic control are in demand and are particularly critical in providing an adequate visual warning to pilots of the existence of a closed runway where visual warnings are necessary in addition to voice warnings from the traffic controller. In designing a warning light system for use as a runway marker, it is important that the device be readily transportable so as to be capable of being vehicle-mounted or towed by a vehicle into and out of position in a minimum of time. Further, it is desirable to enable towing of one or more marker systems at a time so that one may be positioned at each end of the runway. In the past, among other problems in effectively designing runway markers is to construct the markers large enough and bright enough to be readily visible for several miles but nevertheless be capable of being collapsed or retracted into a relatively compact size that can be readily towed around a crowded aircraft terminal.

Of the warning light systems that have been devised for traffic control, U.S. Pat. No. 4,835,515 to J. A. McDermott et al discloses a vehicle-mounted signal light system which is intended for use on emergency vehicles and consists of light bars that are pivoted at an end of a frame so that teach bar must be independently pivoted or rotated in an upward direction to a specific acute angle. U.S. Pat. No. 4,253,085 to H. T. Hidler et al proposes to mount a series of lights in perforated metal tubing members which are arranged in various configurations but is not readily transportable and not suited for use as a runway marker. U.S. Pat. No. 4,759,606 to R. A. McDowell discloses an arrangement of marker lights with a reflector assembly on light bars or struts which are joined at a common center and specifically designed for use by a vehicle driver to place near the vehicle in the case of vehicle breakdown. However, the device is designed to be stowed within the vehicle when not in use and is not conformable for mounting on a vehicle so as to be readily advanced into a position to serve as a warning light. Other U.S. Letters Patent of interest are U.S. Pat. Nos. 1,334,191 to T. G. Thomas; 1,987,863 to L. S. Murphy; 2,782,745 to W. C. Paschke; 3,487,553 to A. L. Stingl; 4,170,767 to J. H. Tanner; 4,812,844 to W. H. Kallstrom and 4,857,920 to S. Kataoka et al. To our knowledge, no one has successfully devised a runway marker system which is readily transportable in the manner described and which can be expanded to a size greatly in excess of the supporting frame or structure and tilted to the desired angle so as to be readily visible to approaching aircraft.

SUMMARY OF THE INVENTION

Accordingly, it is an object of the present invention to provide for a novel and improved warning light system which is specifically adaptable for use as a runway marker to warn pilots of a closed runway or taxiway.

It is another object of the present invention to provide for a novel and improved runway marker which is readily transportable either by mounting on a vehicle or by being towed into position on a wheeled frame and wherein marker lights are expandable from a compact stored position to an extended position many times the size of the vehicle or frame.

A further object and feature of the present invention is to provide in a runway marker for a novel and improved light reflector assembly of a size and intensity that is readily visible for substantial distances.

A still further object of the present invention is to provide for a novel and improved runway marker system which can be towed either singly or in pairs in a retracted position and rapidly expanded into an operative position at the intended site of use.

In accordance with the present invention, a portable warning light system has been devised which comprises a main frame member adapted to be towed or otherwise mounted externally of a vehicle, means for pivotally mounting the main frame member for movement between a substantially horizontal position and an acute angle to the horizontal, and a plurality of elongated light bars including means pivotally supporting the light bars for movement with respect to the main frame member and in a plane parallel to the main frame member between a retracted position for towing to the intended site of use and an extended position when tilted into position to serve as an effective warning light. Preferably, the light bars are pivotally interconnected at a common center to the center of the frame and each light bar has a trough-shaped assembly with a plurality of lights arranged along the length of each assembly; and the assemblies are pivotal between a position in which the light bars are substantially parallel to one another and an extended position in which the light bars are at substantial angles to one another.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 2 is a side view in elevation of the preferred form of runway marker system shown in FIG. 1;

FIG. 3 is a rear view in elevation of the preferred form of marker system;

FIG. 4 is an enlarged fragmentary view of one of the light bars of the preferred form of runway marker system;

FIG. 5 is a side view of the light bar assembly shown in FIG. 4;

FIG. 6 is a cross-sectional view taken about lines 6—6 of FIG. 4; and

FIG. 7 is a sectional view taken about lines 7—7 of FIG. 1.

DETAILED DESCRIPTION OF THE PREFERRED EMBODIMENT

Figure 1:
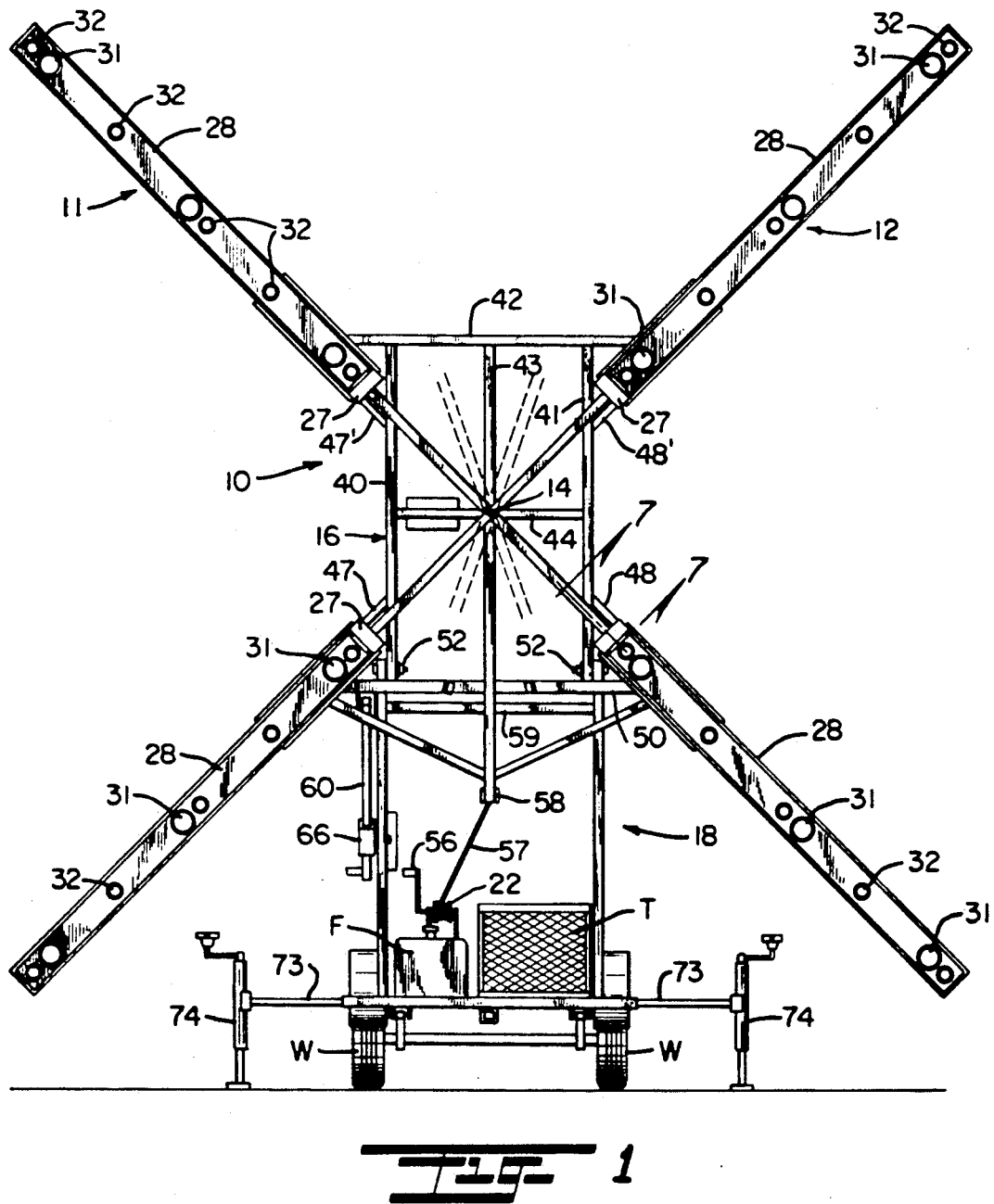
FIG. 1 is a front view of a preferred form of runway marker system in accordance with the present invention.

Referring in more detail to the drawings, a preferred form of warning light system is in the form of a runway marker apparatus 10 which is broadly comprised of scissors-like light bars 11 and 12 pivoted at a common center 14 on a main frame 16, the light bars being movable about the pivot point 14 from a substantially parallel or coextensive relationship, as shown dotted in FIG. 1, to an extended criss-cross arrangement as shown in full in FIGS. 1 and 3. The main frame 16 is pivotally mounted on an open base frame 18 of a trailer 20, and the frame 16 is tiltable from a vertical position to an inclined position, as shown in FIG. 2, under the control of a winch 22.

An important feature of the present invention resides in the pivotal mounting of the light bars 11 and 12 for movement in a plane parallel to the plane of the frame 16 so that in the collapsed position as described the bars are within the width of the frame and can be readily transported from one site to another. For this purpose, the bars 11 and 12 are correspondingly made up of tubular strut members 25, each strut member terminating in a free end which is inserted in a slot 27 adjacent to a gusset plate 26 at opposite ends of the strut member; and an elongated, generally channel-shaped light holder 28 forms a continuation of each strut 25. In turn, each holder assembly 28 includes an inner closed end wall surface 30 defining a support for a plurality of lights 31, 32 at spaced intervals along the length of the holder assemblies 28. Opposite sidewalls 33 and 34 flank the end wall surface 30 and this assembly is reinforced by a shallow support tray 29. Preferably, the lights 31 are larger spotlights, the smaller lights 32 are amber spotlights, and the lights 31, 32 are recessed within the channels as shown to better concentrate and project the light for enhanced illumination.

The frame 16 is preferably of flat, generally rectangular configuration having spaced parallel side bars 40 and 41, a common end bar 42 at its upper end, and vertical and horizontal brace members 43 and 44 intersecting one another and pivotally connected at their point of intersection to the common center 14 of the markers 11 and 12. Inclined brace members 45 and 46 are directed downwardly and outwardly away from the side bars 41 and are rigidly connected to lower inclinded brace members 47 and 48 along with horizontal brace member 50 at the lower end of the frame 16. Upper braces 47' and 48' incline upwardly and outwardly from the sides 40 and 41 for rigid connection into the upper upper horizontal frame portion 42.

The side braces 40 and 41 are pivoted as at 52 at their lower ends to the upper end of the base frame 18 to permit tilting movement of the frame 16 under the control of the winch 22. The winch 22 is mounted on a stand 55 and includes a suitable hand crank 56 and winch line 57 attached to a bracket 58 at the lower end of the center brace 43. The inclined braces 47 and 48 are joined to the center brace 43 directly above the bracket 58, and the front of the frame 18 serves as a limit stop when the markers 11 and 12 are raised into the vertical position as illustrated in FIGS. 1 and 2. As further seen from FIG. 2, a slope indicator rod 60 inclines downwardly and rearwardly away from its pivotal connection to one side of the lower end of the main frame 16 to assist in positioning the frame 16 and markers 11 and 12 at one of several inclined positions, as illustrated in dotted form in FIG. 2. The indicator rod 60 is slidable through a sleeve 66 connected in swivelled relation to one side of the frame 18, and is fixed at the desired position by a pin 67 inserted through aligned openings in the rod 60 and sleeve 66, there being a plurality of openings along the length of the sleeve 66 as well as spaced openings 68 in the rod 60. A shock absorber in the form of a cylinder 61 includes a piston rod which is attached to a brace member, not shown, centrally beneath the point of pivotal support of the main frame at 52, and the opposite end of the cylinder 61 is secured to a cross brace member 64.

The base frame 18 of the trailer is of open generally rectangular configuration having a platform 70 mounted on ground-engaging wheels W and a front castor R with a ball-type connector 71 for a hitch at the rear end of the trailer and a socket connection 72 for a hitch at the front end. Leveling jacks 74 are disposed on outriggers 73 at the four corners of the platform, and the upper portion of the base frame includes vertical legs 75 at the four corners joined together by suitable horizontal brace members 76. A suitable control box is designated at C and includes a splitter circuit, not shown, to regulate the operation of the light bars 11 and 12.

It will be noted that an upper brace member 77 extends horizontally between the rear corners 75 to serve as a support and limit stop for the light bars 11, 12 when the latter are tilted into the rearwardly and downwardly inclined position, as shown dotted in FIG. 2. As previously described, the light bars 11 and 12 can be tilted or adjusted to any intermediate position between the rearwardly inclined position and the vertical position and will be retained by fixing the rod 60 in position. Initially, when the cable 57 is released, the frame 16 is caused to tilt rearwardly by the fluid pressure in the cylinder 61, and the weight of the frame 16 will tend to cause it to continue its downward tilting toward the rearwardly inclined position.

For the purpose of illustration but not limitation, the light bars 11 and 12 may be on the order of 25' to 30' long and contain sixteen sealed beam lights in each arm. The channel-shaped beam portions 28 are preferably composed of a light-weight aluminum material and which is surfaced with a non-glare material for increased visibility by focusing or concentrating the light beams. A power supply as designated at T suitably includes a four-cycle diesel or gasoline engine with a 12volt alternator, heavy duty battery, separate fuel tank F and appropriate meters, not shown. The control box C includes the necessary solid state circuitry to regulate the lights and preferably includes a flasher circuit and voltage regulator to regulate the flash rate and degree of brightness of the lights 31 and 32.

As noted particularly from FIG. 3, the light bars 11 and 12 can be adjusted between a collapsed position in which the arms extend substantially parallel to one another, as shown dotted, and an extended position in which the arms are arranged in a mutually perpendicular, criss-cross arrangement to produce an X-shaped array of lights. In this connection, the upper brace members 47', 48' which form lateral extensions from the upper end of the main frame 16 together with the lower inclined braces 47, 48 lend additional support to the light bars 11, 12 when extended into the criss-cross arrangement.

In use, the apparatus is towed into position with the light bars 11 and 12 in the inclined position shown in FIG. 2 but with the leveling jacks 74 and front castor R raised so that the entire weight is carried by the wheels W. With the light bars 11, 12 in one of the inclined positions as shown, two or more apparatus 10 can be towed in tandem by connecting a male hitch 71 of one to a female hitch of the next successive apparatus, and the light bars 11, 12 of the trailing apparatus will overlap the light bars 11 and 12 of the leading apparatus so as to be somewhat nested together. A particular advantage of towing two or more apparatus together is to enable one to be positioned at one end of the runway and the other at the opposite end. Once at the intended site of use, the leveling jacks are lowered along with the castor R, following which the pin 67 is removed from the slope indicator rod 60 and the winch 22 is manually operated to raise the light bars 11 and 12 into position, such as, the vertical disposition illustrated in FIGS. 1 and 3. Specifically, the light bars 11, 12 can be adjusted to any one of four positions each for vertical and horizontal as determined by the spacing of the openings 68 in the slope indicator rod 60 and sleeve 66 so that in one of the selected positions the pin 67 can be inserted through the sleeve into one of the aligned openings 68 in the rod. The light bars 11, 12 are expanded from the collapsed position, as shown dotted in FIG. 1, to the generally criss-cross or X-shaped arrangement as shown in full and this can be done simply by exerting manual pressure at the lower ends of the bars 11 and 12 to swing them outwardly away from one another. In order to return to the travel position, the cable or winch line 57 is released and the pressurized cylinder 61 will initially urge the light bars 11 and 12 rearwardly about their pivot 52 whereupon the weight of the light bars 11 and 12 will then cause them to continue to drop into the inclined position as shown in FIG. 2 with the light bars resting on the brace 77; or in the alternative can rest on an upper rear adjustable bracket support bar 59 which is adjustably positioned at different levels with respect to the rear corner legs 75 by insertion of pins through selected aligned openings in the legs 75 and vertical sides of the support bar 59.

It is to be understood from the foregoing that while a preferred embodiment of the present invention is herein set forth and described, various modifications and changes may be made without departing from the spirit and scope of the present invention as defined by the appended claims and reasonable equivalents thereof.

I claim:

1. A portable warning light system comprising:
   a base frame and a main frame member;
   means pivotally mounting said main frame member on said base frame for movement between substantially horizontal and vertical positions as well as selected angles therebetween including means for releasably locking said main frame member at said different selected angles between the vertical and horizontal positions;
   a plurality of elongated light bars, said light bars each including a generally channel-shaped light support member and a plurality of signal lights arranged at spaced intervals along each of said light support members;
   means pivotally supporting said light bars on said main frame member for pivotal movement in a plane parallel to said main frame member between a retracted position and extended position, said pivotal supporting means including said light support members intersecting one another at a common center of said main frame member and pivotal between a position in which said light bars are substantially parallel to one another and an extended position in which said light bars are at substantially 90° to one another.

2. A portable warning light system according to claim 1, said base frame having ground-engaging wheels, said main frame member being pivotally mounted with respect to said base frame about a pivotal axis spaced beneath the pivotal support of said light bars on said main frame member, and means for raising and lowering said main frame member between a substantially vertical position and a substantially horizontal position.

3. A portable warning light system according to claim 2, said base frame being in the form of a trailer, and means for towing said trailer into and away from the the intended site of use.

4. A portable warning light system according to claim 3, said towing means including a hitch member at leading and trailing ends thereof.

5. A portable runway marker apparatus adaptable for use as a visual warning system to pilots of a closed runway or taxiway at an airport terminal, said apparatus comprising:
   a towable base frame member;
   a main frame member including means pivotally mounting said main frame member on said base frame member for movement between substantially horizontal and vertical positions as well as selected angular positions therebetween;
   a plurality of elongated light bars, said light bars intersecting one another at a common center of said main frame member, each said light bar having an elongated generally channel-shaped light support member and a plurality of signal lights arranged at longitudinally spaced intervals along each of said light support members; and
   means pivotally supporting said light bars on said main frame member for movement in a plane parallel to said main frame member between a retracted position in which said light bars extend substantially parallel to one another and an extended position in which said light bars are substantially perpendicular to one another.

6. Apparatus according to claim 5, said main frame member being of generally open rectangular configuration and elongated in the direction of travel of said base frame member, said pivotal mounting means for said main frame member disposed adjacent to one end of said main frame member for pivotal connection to an upper end of said base frame member.

7. Apparatus according to claim 5, including means for releasably locking said main frame member at different selected angles between the vertical and horizontal positions.

8. Apparatus according to claim 7, said base frame member including means for supporting said main frame member in a position inclining rearwardly and downwardly away from a leading end of said base frame member, and lift means between said base frame member and said frame member for lifting said main frame member and said light bars from a rearwardly inclined position to the vertical position.

9. Apparatus according to claim 5, including biasing means between said base frame member and said main frame member for yieldingly urging said main frame member in a direction away from the vertical position toward the horizontal position.

10. Apparatus according to claim 5, including hitch means for connecting a plurality of said runway marking apparatus in tandem for towing to the intended site of use.

* * * * *